United States Patent
Abu-Shanab et al.

(10) Patent No.: US 8,518,493 B2
(45) Date of Patent: Aug. 27, 2013

(54) CO-CURE PROCESS FOR AUTODEPOSITION COATING

(75) Inventors: Omar Abu-Shanab, Auburn Hills, MI (US); Michael Inch, Grosse Pointe Farms, MI (US); Bashir M. Ahmed, Rochester, MI (US); Christopher G. Weller, Royal Oak, MI (US); Derek W. Smith, Eastpointe, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/831,794

(22) Filed: Jul. 7, 2010

(65) Prior Publication Data

US 2011/0003161 A1 Jan. 6, 2011

Related U.S. Application Data

(63) Continuation of application No. PCT/US2009/000045, filed on Jan. 6, 2009.

(51) Int. Cl.
*B05D 7/14* (2006.01)
*B05D 3/10* (2006.01)
*B05D 7/16* (2006.01)
*C23C 28/00* (2006.01)
*C23F 11/00* (2006.01)

(52) U.S. Cl.
CPC . *B05D 7/144* (2013.01); *B05D 7/16* (2013.01)
USPC .................. 427/388.1; 427/409; 427/410

(58) Field of Classification Search
USPC .................. 427/337, 372.2, 384, 385.5, 386, 427/388.1, 407.1, 409, 410, 508, 553, 557
See application file for complete search history.

(56) References Cited

U.S. PATENT DOCUMENTS

| | | | |
|---|---|---|---|
| 3,592,699 A | 7/1971 | Steinbrecher et al. | |
| 4,108,817 A | 8/1978 | Lochel | |
| 4,178,400 A | 12/1979 | Lochel | |
| 4,180,603 A | 12/1979 | Howell, Jr. | |
| 4,242,379 A | 12/1980 | Hall et al. | |
| 4,243,704 A | 1/1981 | Hall et al. | |
| 4,289,826 A | 9/1981 | Howell, Jr. | |
| 5,300,323 A | 4/1994 | Ahmed | |
| 5,342,694 A | 8/1994 | Ahmed et al. | |
| 5,500,460 A | 3/1996 | Ahmed et al. | |
| 6,096,806 A | 8/2000 | Mueller et al. | |
| 6,143,365 A * | 11/2000 | Ahmed ........................ | 427/341 |
| 6,559,204 B1 | 5/2003 | Agarwal | |
| 6,645,633 B2 * | 11/2003 | Weller et al. .................. | 428/418 |
| 6,805,768 B2 | 10/2004 | Agarwal et al. | |
| 6,989,411 B2 | 1/2006 | Bammel et al. | |
| 2003/0082391 A1 * | 5/2003 | Goodreau et al. ............ | 428/461 |

FOREIGN PATENT DOCUMENTS

| | | |
|---|---|---|
| CN | 1130362 A | 9/1996 |
| JP | 1997501350 | 2/1997 |
| JP | 2001009365 A | 1/2001 |
| JP | 2003176449 A | 6/2003 |
| JP | 2004315974 A | 11/2004 |
| JP | 2008196043 A | 8/2008 |
| KR | 1019990067884 | 8/1999 |

OTHER PUBLICATIONS

Machine Translation of KR1019990067884 (Honda et al.), Aug. 1999.*
Daeid, N., ed., "16th International Forensic Science Symposium Interpol-Lyon: Review Papers," Oct. 2010, pp. 118-119.*
Henkel Corporation, "Aquence Co-Cure Process," 2011, 2 pages.*
International Preliminary Report on Patentability for PCT/US2009/000045, Jul. 13, 2010, 6 pages.*
International Search Report for PCT/US2009/000045, issued Jul. 20, 2009, 2 pages.

* cited by examiner

*Primary Examiner* — William Phillip Fletcher, III
(74) *Attorney, Agent, or Firm* — Mary K. Cameron

(57) ABSTRACT

A coated article comprising a metal surface, a first layer of an uncured autodeposition coating and a second uncured paint layer deposited sequentially on the surface without intermediate curing of the autodeposition coating, a process of co-curing said autodeposition coating and paint layer or layers, and a cured coated article having chemical bonds between the cured autodeposition coating layer and at least the cured paint layer immediately adjacent to the cured autodeposition coating layer.

24 Claims, No Drawings

CO-CURE PROCESS FOR AUTODEPOSITION COATING

CROSS-REFERENCE TO RELATED CASES

This application is a continuation under 35 U.S.C. Sections 365(c) and 120 of International Application No. PCT/US2009/000045, filed Jan. 6, 2009 and published on Jul. 16, 2009 as WO 2009/088993, which claims priority from U.S. Provisional Patent Application Ser. No. 61/019643 filed Jan. 8, 2008, which are incorporated herein by reference in their entirety.

FIELD OF THE INVENTION

This invention relates to a coated article comprising a metal surface, a first layer of an uncured autodeposition coating and a second uncured paint layer deposited sequentially on the surface without intermediate curing of the autodeposition coating, a process of co-curing said autodeposition coating and paint layer or layers, and a cured coated article having chemical bonds between the cured autodeposition coating layer and at least the cured paint layer immediately adjacent to the cured autodeposition coating layer. The coated article and process are useful in manufacture of corrosion resistant painted articles having metal surfaces. One benefit of the invention is a reduction in the number of steps, floor space, time and energy required to produce the corrosion resistant painted articles and, in some embodiments, a chemical bonding between the autodeposition and paint layers that improves adhesion.

BACKGROUND OF THE INVENTION

Autodeposition coatings, which are adherent coatings formed on metal surfaces, comprise an organic polymer coating deposited by electroless chemical reaction of the coating bath with the metal surfaces. Autodeposition has been in commercial use on ferrous surfaces, in particular steel surfaces, for about thirty years and is now well established for that use. For details, see for example, U.S. Pat. No. 3,592,699 (Steinbrecher et al.); U.S. Pat. Nos. 4,108,817 and 4,178,400 (both to Lochel); U.S. Pat. No. 4,180,603 (Howell. Jr.); U.S. Pat. Nos. 4,242,379 and 4,243,704 (both to Hall et al.); U.S. Pat. No. 4,289,826 (Howell, Jr.); and U.S. Pat. No. 5,342,694 (Ahmed) as well as U.S. Pat. No. 5,500,460 (Ahmed et al.). The disclosures of all of these patents are hereby incorporated by reference. Additional compositions and processes for depositing autodeposition coatings are described in U.S. Pat. Nos. 6,989,411; 6,645,633; 6,559,204; 6,096,806; and 5,300,323, incorporated herein by reference.

Autodeposition compositions are usually in the form of liquid, usually aqueous, solutions, emulsions or dispersions in which active metal surfaces of inserted objects are coated with an adherent resin or polymer film that increases in thickness the longer the metal object remains in the bath, even though the liquid is stable for a long time against spontaneous precipitation or flocculation of any resin or polymer, in the absence of contact with active metal. The resin or polymer used in autodeposition baths is desirably insoluble in water. "Active metal" is defined as metal that is more active than hydrogen in the electromotive series, i.e., that spontaneously begins to dissolve at a substantial rate (with accompanying evolution of hydrogen gas) when introduced into the liquid autodeposition solution, emulsion or dispersion. Typically, the working autodeposition baths are acidic in nature, having pHs ranging from about 1 to about 4. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods, or a like term.

Generally, after removal from the autodeposition bath, the autodeposited coating undergoes a rinse step and a cure step prior to the addition of any paint layer. That is, the autodeposition coating is dried and fully cross-linked before addition of another paint. In a typical processing line for depositing a layer of autodeposition coating and a subsequent layer of paint, two ovens are required; the first oven is used for curing (cross-linking) the autodeposition coating. After exiting the first oven, powder or liquid paint, for example a topcoat, is applied and the part enters a second oven for cure of this second layer, e.g. topcoat, of paint.

The cure step for the autodeposition coating conventionally takes place at temperatures of 165-204° C. for a duration of 10 to 30 minutes. These temperatures have been thought to be required to achieve adequate cross-linking of the autodeposition coating, and use of this cure step to likewise cure secondary paint layers was not considered possible due to gases exiting the autodeposition coating during curing. Prior art attempts to do so resulted in paint defects in the second paint layer surface. As such, after cure of an autodeposition coating in a conventional process, the coated part would be subjected to a second painting step and a second cure step for the paint. Similarly, electrodeposited coating is formulated with low molecular weight epoxy and higher loading of blocked isocyanate and other byproducts (amine and solvent) which requires the electrodeposited coating to be fully cured prior to topcoat application as exiting byproducts cause surface defects. To improve manufacturing efficiencies, it is desirable to combine the above described two curing steps into a single step.

Advantages of co-curing include eliminating processing steps, reducing oven length and reducing oven temperature. It is also desirable to have an uncross-linked autodeposition coating that is dry to handle which allows for transient time, such as for example where a topcoat is to be applied at a location different from the autodeposition coating.

SUMMARY OF THE INVENTION

It is an object of the invention to meet the above-described needs and avoid at least some of the drawbacks of the prior art by providing a process for co-curing an autodeposition coating and paint layer comprising:
   a) contacting a substrate having at least one metal surface with an autodeposition bath at a pH of between about 1 and about 4, for a sufficient time and at a sufficient temperature to deposit an uncured autodeposition coating thereon;
   b) rinsing with water;
   c) optionally, contacting the uncured autodeposition coating with an alkaline or acidic rinse;
   d) optionally, dewatering the uncured autodeposition coating;
   e) depositing an uncured paint layer on the uncured autodeposition coating; and
   f) co-curing the uncured autodeposition coating and uncured paint layer.

It is another object of the invention to provide a coated article comprising a metal surface, a first layer comprising an uncured autodeposition coating and a second layer comprising an uncured paint, different from the first layer, the first and second layers being deposited sequentially.

It is yet another object of the invention to provide a coated article comprising a metal surface, a first layer comprising an uncured autodeposition coating deposited on the metal surface and a second layer comprising an uncured paint layer, different from the first layer, deposited on the uncured autodeposition coating without intermediate curing. It is a yet further object to provide such an article wherein the first layer is dewatered prior to deposition of the second layer. In one embodiment, the second layer is a liquid paint layer, which may be subsequently dried prior to curing. In another embodiment, the second layer is a powder paint layer. In this embodiment, the first layer may be dewatered prior to deposition of the powder paint layer.

It is another object of the invention to provide a cured coated article comprising a metal surface, a first layer of an autodeposition coating and a second paint layer wherein said first and second layers have been co-cured such that the first and second layers are chemically cross-linked to each other. It is a yet further object to provide a cured coated article comprising a metal surface having an at least two layer coating comprising: a first layer of a cured autodeposition coating, a second layer of a cured paint, different from the first layer, and at least one shared cross-linked polymer chain comprising a first polymer chain portion in said first layer and a second polymer chain portion in said second layer.

It is an object of the invention to provide a process according to the invention wherein the autodeposition working bath comprises:
  a. at least 1.0%, based on the whole composition, of a component of dissolved, dispersed, or both dissolved and dispersed film foaming polymer molecules;
  b. at least one emulsifier in sufficient quantity to emulsify any water insoluble part of any other component so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any metal that reacts with the autodepositing liquid composition to produce therein dissolved metal cations with a charge of at least two;
  c. at least one cross-linker,
  d. at least one dissolved accelerator component selected from the group consisting of acids, oxidizing agents, and complexing agents that are not part of immediately previously recited components, this accelerator component being sufficient in strength and amount to impart to the total autodepositing liquid composition an oxidation-reduction potential that is at least 100 mV more oxidizing than a standard hydrogen electrode;
  e. optionally, at least one filler;
  f. optionally, at least one colorant,
  g. optionally, at least one coalescing agent, and
  h. water.

It is an object of the invention to provide a process for treating an article comprising a substrate having at least one active metal surface comprising:
  a) contacting a substrate having at least one active metal surface with an autodeposition liquid composition comprising:
    1) at least 1.0%, based on the autodeposition liquid composition, of a component of dissolved, dispersed, or both dissolved and dispersed film fowling polymer molecules, desirably, the film forming polymer molecules are selected from polymers and copolymers of acrylic, polyvinyl chloride, epoxy, polyurethane, phenol-formaldehyde condensation polymers, epoxy-acrylic hybrid polymer and mixtures thereof;
    2) optionally at least one emulsifier;
    3) optionally at least one cross-linker,
    4) at least one dissolved accelerator component selected from the group consisting of acids, oxidizing agents, and complexing agents that are not part of immediately previously recited components (1), (2) or (3), this accelerator component being sufficient in strength and amount to impart to the total autodepositing liquid composition an oxidation-reduction potential that is at least 100 mV more oxidizing than a standard hydrogen electrode;
    the pH of the autodeposition bath being between about 1 and about 4, for a sufficient time and at a sufficient temperature to deposit an uncured autodeposition coating on said at least one active metal surface;
  b) rinsing with water;
  c) optionally, contacting the uncured autodeposition coating with an alkaline or acidic rinse;
  d) optionally, dewatering the uncured autodeposition coating;
  e) depositing an uncured paint layer on the uncured autodeposition coating; and
  f) co-curing the uncured autodeposition coating and uncured paint layer.

It is an object of the invention to provide a process according to the invention wherein the uncured autodeposition coating comprises a cross-linker and wherein said coating is dewatered at a temperature of about 10 to 50, preferably 13 to 43 degrees less than the cross-linker de-blocking temperature.

It is another object of the invention to provide a process wherein the uncured autodeposition coating is dewatered at a temperature of about 70-150 ° C.

It is also an object of the invention to provide a process wherein the co-cure temperature is at least 163° C.

It is also an object of the invention to provide an article of manufacture comprising: (a) a substrate comprising a metal surface; and (b) a corrosion resistant layer deposited according to any of the above-described processes on said metal surface.

It is also an object of the invention to provide a coated article comprising a metal surface; a first layer comprising an uncured autodeposition coating deposited on the metal surface; and a second layer, different from the first layer, comprising an uncured paint layer deposited on the uncured autodeposition coating without intermediate curing.

Except in the claims and the operating examples, or where otherwise expressly indicated to the contrary, all numerical quantities in this description indicating amounts of material or conditions of reaction and/or use are to be understood as modified by the word "about" in describing the broadest scope of the invention. Practice within the numerical limits stated is generally preferred, however. Also, throughout the description and claims, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole, and any counterions thus implicitly specified preferably are selected from among other constituents explicitly specified in ionic form, to the extent possible; otherwise such counterions may be freely selected, except for avoiding counterions that act adversely to the objects of the invention; the term "paint" and its grammatical variations includes any more specialized types of protective exterior coatings that are also known as, for example, lacquer, electropaint, shellac, top coat, base coat, color coat, and the like; and the term "mole" and its variations may be applied to ionic, chemically unstable neutral, or any other chemical species, whether actual or hypothetical, that is specified by the type(s) of atoms present and the number of each type of atom included in the unit defined, as well as to substances with well defined neutral molecules.

DETAILED DESCRIPTION OF THE INVENTION

Applicants have found that powder and liquid paints, for example topcoats, can be deposited on uncured autodeposition coatings, and thereafter the paint and underlying autodeposited coating cured together according to processes of the invention without adversely affecting corrosion performance or surface appearance of the coated metal surface.

A process according to the invention for co-curing an autodeposition coating and paint layer is provided herein comprising:
 a) contacting a substrate having at least one metal surface with an autodeposition bath at a pH of between about 1 and about 4, for a sufficient time and at a sufficient temperature, a typical autodeposition bath is maintained at ambient temperature, for example about 10° C.-38° C., preferably 15-30° C., most preferably 20-23° C. to deposit an uncured autodeposition coating thereon;
 b) rinsing with water;
 c) optionally, contacting the uncured autodeposition coating with an alkaline or acidic rinse;
 d) optionally, dewatering the uncured autodeposition coating;
 e) depositing an uncured paint layer on the uncured autodeposition coating; and
 f) co-curing the uncured autodeposition coating and uncured paint layer.

Within the above-described process, the first layer and the second layer of the present invention can be applied in any conventional manner that does not unduly interfere with the objects of the invention. For example, with respect to an uncured autodeposition coating, ordinarily a metal surface is degreased and rinsed with water before applying the autodeposition coating. Conventional techniques for cleaning and degreasing the metal surface to be treated according to the invention can be used for the present invention. Step (b), rinsing with water can be performed by exposure to running water, but will ordinarily be performed by immersion for from 10 to 120 seconds, or preferably from 20 to 60 seconds, in water at ordinary ambient temperature.

In a preferred embodiment, the metal surface to be coated is cleaned with an acidic cleaner prior to autodeposition coating. The acidic cleaner may contain inorganic and/or organic acid. Suitable acidic cleaners such as 182A Cleaner, 7005 Cleaner, 7150 Cleaner, 7310 Cleaner, 7320 Cleaner are commercially available from Henkel Corporation. Optionally, an ultrasonic water rinse, as is known in the art, can be used after the cleaning step.

Any method can be used for contacting a metal surface with the autodeposition composition of the present invention. Examples include immersion (e.g., dipping), spraying or roll coating, and the like. Immersion is usually preferred. The metal surface is left in contact with the autodeposition bath for a sufficient time, for example from 30-300 seconds, to deposit a first layer of an uncured autodeposition coating on the metal surface. The substrate is then removed from the autodeposition bath and rinsed with water. Optionally, an acidic or alkaline rinse can be used after or instead of the water rinse and may be maintained at temperatures of 10° C. up to about 90° C.

An optional dewatering step may also be used and is differentiated from the cure step by the lower temperatures and/or shorter time of heating used such that less than 50, 40, 30, 20, 10, 5 or 1 percent by dry weight of resin or polymer in the uncured autodeposition coating chemically reacts with itself or with other molecules to form cross-linkages. The resulting dewatered uncured autodeposition coating remains substantially uncross-linked after dewatering until subjected to a curing step. Substantially uncross-linked as used herein means, with increasing preference in the order given, less than 50, 40, 30, 20, 10, 5 or 1 percent by dry weight of resin in the autodeposition coatings is cross-linked.

Depending upon manufacturing requirements, a second layer of uncured paint, different from the first layer, may be applied to a wet uncured autodeposition coating or the uncured autodeposition layer may be dewatered prior to application of the second layer of uncured paint. In one embodiment, the first layer of uncured autodeposition coating is dewatered prior to depositing an uncured paint layer on the uncured autodeposition coating. In an alternative embodiment, the dewatering step may take place after application of the second layer of uncured paint to the first layer of uncured autodeposition coating.

Temperatures for the dewatering step vary depending upon the temperature at which the uncured autodeposition coating cross-links. The peak metal temperature during dewatering is desirably less than a temperature at which a cross-linker present in the autodeposition coating is activated, that is begins to react to form cross-linkages. If both layers are applied prior to dewatering, the temperature for dewatering is selected such that it is less than the temperature at which the cross-linker in the autodeposition coating is activated or the curing temperature of the second paint layer, e.g. topcoat, whichever is lower. In one embodiment, the first layer of uncured autodeposition coating is dewatered at temperatures ranging from 90° C. to 160° C. for 1-10 minutes, preferably at least 100° C. In a second embodiment, higher dewatering temperatures of 90° C. up to 165° C. have been found to be acceptable provided that the duration of heating and part geometry are selected such that the uncured autodeposition coating remains substantially uncross-linked.

The second layer of uncured paint, different from the first layer of autodeposited coating, can be applied by conventional industrial painting methods known to those of skill in the manufacturing arts, such as spraying, dipping, electrostatic deposition, powder coating techniques and the like, provided that such methods do not unduly interfere with the corrosion resistance of the cured article by for example dissolving the uncured autodeposition coating.

A single curing step is provided for curing the first and second layers on the metal surface. Desirably, temperatures used to co-cure the two layers are greater than or equal to a temperature at which a cross-linker present in the autodeposition coating is activated and are of a duration sufficient to chemically cross-link at least 50, 60, 70, 80, 90 or 100 percent of the available cross-linking functional groups in the autodeposition coating. In one embodiment, the peak metal temperature of the cure step ranges from about 175° C. to about 235° C.

The first and second layers are co-cured, meaning that the autodeposition coating undergoes a first cross-linking reaction and the second layer of paint is cured and/or undergoes a second cross-linking reaction. The first and second cross-linking reactions may be of different types or may be of the same type, such as by way of non-limiting example reactions of OH groups with NCO groups. In one embodiment, the autodeposition coating layer and paint layer cross-link to each other providing improved paint adhesion.

Co-curing the uncured autodeposition coating and uncured paint layer together provides a number of manufacturing efficiencies by reducing the number of cure steps and space requirements of the processing line as well as lowering energy costs. Additional paint layers may be added to a metal article having a first and second layer according to the invention.

Autodeposition baths that can be used with lower cure temperatures according to the invention include various water-based coatings for metallic surfaces that utilize dispersions of resins capable of forming a protective coating when cured. Commercially available autodeposition baths are suitable for use with the lower cure temperatures and can be readily practiced by one of skill in the art by reference to this description and the autodeposition literature cited herein. Desirably, the autodeposition bath comprises an organic component selected from film forming polymer molecules such as polymers and copolymers of acrylic, epoxy, polyurethane, phenol-formaldehyde condensation polymers, and mixtures thereof. Preferred polymers and copolymers are epoxy; acrylic; and mixtures thereof; most preferably an epoxy-acrylic copolymer.

Suitable examples of autodeposition compositions useful in the invention include an autodeposition working bath comprising:

(a) at least 1.0%, based on the whole composition, of a component of dissolved, dispersed, or both dissolved and dispersed film forming polymer molecules; desirably polymers and copolymers of acrylic, polyvinyl chloride, epoxy, polyurethane and mixtures thereof; preferably an epoxy-acrylic hybrid polymer.

(b) at least one emulsifier in sufficient quantity to emulsify any water insoluble part of any other component so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any metal that reacts with the autodepositing liquid composition to produce therein dissolved metal cations with a charge of at least two;

(c) at least one cross-linker, this cross-linker may be comprised of two reactive functional groups of component (a), referred to as internally cross-linking, or may be comprised of a composition reactive with at least one functional group of component (a), referred to herein as externally cross-linking;

(d) at least one dissolved accelerator component selected from the group consisting of acids, oxidizing agents, and complexing agents that are not part of immediately previously recited components (A) or (B), this accelerator component being sufficient in strength and amount to impart to the total autodepositing liquid composition an oxidation-reduction potential that is at least 100 mV more oxidizing than a standard hydrogen electrode;

(e) optionally, at least one filler;
(f) optionally, at least one colorant,
(g) optionally, at least one coalescing agent, and
(h) water.

Desirably, the cross-linker and polymer molecules are selected such that an autodeposition coating on a metal surface resulting from contacting said surface with said working bath cross-links when cured simultaneously with subsequently applied paint layers.

In one embodiment, the autodeposition composition utilizes an epoxy/acrylic binder chemistry where the high molecular weight acrylic segment results in low temperature film formation that is dry to handle with no edge wrinkling and film shrinkage. In a preferred embodiment, blocked isocyanate external cross-linker is used. The amounts of the cross-linker desirably are selected such that it is insufficient to cause film defects as the blocking agent leaves the topcoated system during topcoat curing. Suitable amounts of blocked isocyanate, when present, are at least in increasing order of preference 0.01, 0.1, 0.5, 1, 2, 3 or 4%, and are preferably less than in increasing order of preference 15, 13, 11, 10, 9, 8, 7, 6, 5% of dried solids and independently preferably, when present, are at least in increasing order of preference 0.01, 0.1, 0.5 or 1% and are less than 6, 5, 4, 3, or 2% of the wet film.

Metal substrates having uncured autodeposition coatings deposited from autodeposition baths comprising Aquence® 915 and autodeposition baths comprising Aquence® 925G, both epoxy acrylic autodeposition compositions commercially available from Henkel Corporation, were topcoated with powder and showed a broad range of suitable cure temperatures. The uncured autodeposition coatings were dewatered at a range of 121-163° C. and 138-182° C. for Aquence® 925G and 915 respectively. Aquence® 925G uncured autodeposition coating was topcoated with polyester/Primid powder and the two layers were co-cured at (175-225° C.). Aquence® 915 uncured autodeposition coating was topcoated with polyester/TGIC powder and the two layers were co-cured at 190° C. Physical performance measured by cross hatch adhesion, reverse/direct impact, and chip resistance and corrosion performance measured by 500-1000 hours neutral salt spray showed performance consistency throughout the co-cure temperature range. The co-cure of autodeposition coatings with powder topcoats offer time and temperature reductions for the dewatering oven. In one embodiment, the high molecular weight of the polymer allows for film formation and dry to touch coating at low temperature, as well as very low VOC ($\leqq 0.03$ lb/gallon), small amounts of blocked NCOs, and no other volatile chemicals such as amines.

To prepare a bath composition suitable for coating a metallic substrate by autodeposition, at least one of the aforedescribed polymers in aqueous emulsion or dispersion is combined with an autodeposition accelerator component which is capable of causing the dissolution of active metals (e.g., iron and zinc) from the surface of the metallic substrate in contact with the bath composition. Preferably, the amount of accelerator present is sufficient to dissolve at least about 0.020 gram equivalent weight of metal ions per hour per square decimeter of contacted surface at a temperature of 20° C. Preferably, the accelerator(s) are utilized in a concentration effective to impart to the bath composition an oxidation-reduction potential that is at least 100 millivolts more oxidizing than a standard hydrogen electrode. Such accelerators are well-known in the autodeposition coating field and include, for example, substances such as an acid, oxidizing agent, and/or complexing agent capable of causing the dissolution of active metals from active metal surfaces in contact with an autodeposition composition. The autodeposition accelerator component may be chosen from the group consisting of hydrofluoric acid and its salts, fluosilicic acid and its salts, fluotitanic acid and its salts, ferric ions, acetic acid, phosphoric acid, sulfuric acid, nitric acid, peroxy acids, citric acid and its salts, and tartaric acid and its salts. More preferably, the accelerator comprises: (a) a total amount of fluoride ions of at least 0.4 g/L, (b) an amount of dissolved trivalent iron atoms that is at least 0.003 g/L, (c) a source of hydrogen ions in an amount sufficient to impart to the autodeposition composition a pH that is at least 1.6 and not more than about 5. Hydrofluoric acid is preferred as a source for both the fluoride ions as well as the proper pH. Ferric fluoride can supply both fluoride ions as well as dissolved trivalent iron. Accelerators comprised of HF and $FeF_3$ are especially preferred for use in the present invention.

In one embodiment, ferric cations, hydrofluoric acid, and $H_2O_2$ are all used to constitute the autodeposition accelerator component. In a working composition according to the invention, independently for each constituent: the concentration of ferric cations preferably is at least, with increasing preference in the order given, 0.5, 0.8 or 1.0 g/l and independently preferably is not more than, with increasing preference in the order given, 2.95, 2.90, 2.85, or 2.75 g/l; the concentration of fluorine in anions preferably is at least, with increasing preference in the order given, 0.5, 0.8, 1.0, 1.2, 1.4, 1.5, 1.55, or 1.60 g/l and independently is not more than, with increasing preference in the order given, 10, 7, 5, 4, or 3 g/l; and the amount of $H_2O_2$ added to the freshly prepared working composition is at least, with increasing preference in the order given, 0.05, 0.1, 0.2, 0.3, or 0.4 g/l and independently preferably is not more than, with increasing preference in the order given, 2.1, 1.8, 1.5, 1.2, 1.0, 0.9, or 0.8 g/l, with additions of $H_2O_2$ made thereafter such that a consistent minimum concentration, that is a consistent minimum concentration of at least 100 parts per million is achieved.

A dispersion or coating bath composition of the present invention may also contain a number of additional ingredients that are added before, during, or after the formation of the dispersion. Such additional ingredients include fillers, biocides, foam control agents, pigments and soluble colorants, and flow control or leveling agents. The compositions of these various components may be selected in accordance with the concentrations of corresponding components used in conventional epoxy resin-based autodeposition compositions, such as those described in U.S. Pat. Nos. 5,500,460, and 6,096,806.

Suitable flow control additives or leveling agents include, for example, the acrylic (polyacrylate) substances known in the coatings art, such as the products sold under the trademark MODAFLOW® by Solutia, as well as other leveling agents such as BYK-310 (from BYK-Chemie), PERENOL® F-60 (from Henkel), and FLUORAD® FC-430 (from 3M).

Pigments and soluble colorants may generally be selected for compositions according to this invention from materials established as satisfactory for similar uses. Examples of suitable materials include carbon black, phthalocyanine blue, phthalocyanine green, quinacridone red, hansa yellow, and/or benzidine yellow pigment, and the like.

The invention and its benefits may be further appreciated by consideration of the following, non-limiting, examples and comparison examples.

EXAMPLES

Example 1

Commercially available, cold rolled-steel (CRS) panels were contacted with an autodeposition bath comprising Aquence® 925G, commercially available from Henkel Corporation, for a sufficient time to deposit thereon an uncured autodeposition coating of about 0.7 to 0.8 units. The uncured autodeposition coated panels were divided into twelve groups and each group was dewatered at a different temperature in a range of 121-163° C. for 30 minutes. see Table 1. The dewatered panels coated with Aquence® 925G uncured autodeposition coating were topcoated with polyester powder paint from Primid (hydroxyl alkyl amide) and the two layers were co-cured. Each of the groups was co-cured at a different temperature in the range of 175-225° C. for 18 minutes, see Table 1. Chemical co-curing means curing the autodeposition coating/topcoat system at a temperature above the onset of the de-blocking temperature of the blocked NCO in the autodeposition layer. The cured coated CRS panels were tested for corrosion and physical performance as shown in Table 1.

TABLE 1

| | Epoxy Acrylic Autodeposition Coating with a Topcoat of Polyester Primid Powder | | | | | | | | | | | |
|---|---|---|---|---|---|---|---|---|---|---|---|---|
| Autodeposition Dewatering (Oven-1) | 121° C. | | | 135° C. | | | 149° C. | | | 163° C. | | |
| Topcoat Cure ° C. (Oven-2) | 175 | 200 | 225 | 175 | 200 | 225 | 175 | 200 | 225 | 175 | 200 | 225 |
| 504 hrs NSS, total mm | 0.3 | 0.35 | 0.35 | 0.45 | 0.4 | 0.4 | 0.55 | 0.45 | 0.45 | 0.4 | 0.45 | 0.4 |
| 1008 hrs NSS, total mm | 4.1 | 2.1 | 2.4 | 4.3 | 2.7 | 0.7 | 1.6 | 1.8 | 1.9 | 2.6 | 1.9 | 1.1 |
| Crosshatch Adhesion ASTM D 3359-02 | 5B | 5B | 5B | 5B | 5B | 5B | 5B | 5B | 5B | 5B | 5B | 5B |
| Direct Impact In · lb ASTM D2794-93 | 60-80 | 60-80 | 60-80 | 60-80 | 60-80 | 60-80 | 60-80 | 60-80 | 60-80 | 60-80 | 60-80 | 60-80 |
| Gravelometer SAE J400 (RT) | 7A | 7A | 7A | 7A | 7A | 7A | 7A | 7A | 7A | 7A | 7A | 7A |

Gravelometer reading of 7A means that the chip diameter is <1 mm and number of chips in that range is 10-24. The best possible reading is 8A (same size diameter but <10 chips). 5B for Crosshatch means 100% adhesion, no loss. Direct Impact: 60-80 in · lb represents initial point of cracks appearing around the rim, no tape adhesion loss observed even at 160 in · lb (same observation with minor variation seen with all the cure points).

Example 2

CRS panels from Q-Lab Corporation were used for the experiment. An epoxy acrylic autodeposition bath commercially available from Henkel Corporation was used to deposit an uncured autodeposition coating at ~0.7-0.8 mils thickness on nine groups of panels. Thereafter without prior chemical, meaning through chemical reaction such as cross-linking, curing of the autodeposition coating, a black polyester-based powder topcoat available from Akzo Nobel was applied at 2.0-3.0 mil thickness. According to the manufacturer, the topcoat was polyester (COOH functional) TGIC (triglycidyl isocyanurate) high durable (5-years). Each group was dewatered and co-cured under different conditions, see Table 2. Bake times shown in Table 2 represent part metal temperature.

TABLE 2

| Temperature ° C. | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 |
|---|---|---|---|---|---|---|---|---|---|
| Autodeposition Dewatering (20 min.) | 135 | 135 | 135 | 149 | 149 | 149 | 163 | 163 | 163 |
| Co-cure (15 min.) | 177 | 191 | 204 | 177 | 191 | 204 | 177 | 191 | 204 |

Cross-linking within powder chains was primarily a COOH-epoxy reaction. Cross-linking within autodeposition chains was primarily an OH—NCO urethane reaction. Potential chemical interaction between the autodeposition coating layer and topcoat layers at the co-cure interface is NCO from autodeposition with OH from topcoat and/or acid from autodeposition with glycidyl epoxy from powder.

TABLE 3

| Example # | 504 Neutral Salt Spray Total Avg. Scribe Creep (mm) | Tape Adhesion Cross Cut ASTM D 3359-02 Method A | Crosshatch Adhesion Method B | SAE J400 Chipping Rating |
|---|---|---|---|---|
| 2-1 | 0.54 | 5A | 5B (100% Retention) | 7A |
| 2-2 | 0.46 | 5A | 5B (100% Retention) | 7A |
| 2-3 | 0.53 | 5A | 5B (100% Retention) | 7A |
| 2-4 | 0.46 | 5A | 5B (100% Retention) | 7A |
| 2-5 | 0.45 | 5A | 5B (100% Retention) | 7A |
| 2-6 | 0.52 | 5A | 5B (100% Retention) | 7A |
| 2-7 | 0.45 | 3A | 0B (0% Retention) | 7C |
| 2-8 | 0.54 | 4A | 0B (0% Retention) | 7B |
| 2-9 | 0.57 | 4A | 0B (15% Retention) | 7B |

Adhesion Rating scale 5 > 4 > 3; Chipping Rating scale A > B > C.

In Examples 2-7, 2-8 and 2-9, the autodeposition coating was beginning to chemically cross-link at temperatures of ≧163° C. for the dewatering step. For these examples, the topcoat adhesion began to deteriorate. For this example formulation and the cross-linking agent used, optimum temperature for dewatering for a co-cure system was about 120-150° C. Further reducing the dewatering temperature is also applicable as long as de-watering is achieved. For panels 2-1 to 2-6, fully curing the powder resulted in interlocking of chemistry between the autodeposition coating and the powder paint coating. That is, cross-linking between substances in the autodeposition from coating and substances in the topcoat has taken place as evidenced by improved adhesion.

Example 3

In some manufacturing applications, such as automotive, an entire vehicle will go through a process of cleaning, autodeposition coating, post-rinsing, and de-watering. Part of the vehicle will then be topcoated while the other part will not, and then the entire vehicle is ovened. Delay and handling between coating and cure of autodeposition has previously been avoided due to performance issues after handling freshly coated parts. This example tests the performance of the portion that will not be topcoated but will be subjected to the two ovens: de-watering and topcoat (co-cure) ovens.

Steel parts were cleaned with an organic acid cleaner and ultrasound rinsed. Six groups of parts were then coated with an uncured autodeposition coating layer, and subjected to two oven treatments. The first oven treatment exposed Ex. 3-1, 3-2, 3-3 and 3-4 and Control 2 to temperatures in the dewatering range of 135-163° C. and also included treatments of some parts at temperatures sufficient to fully chemically cure the autodeposition coating in the initial oven, namely 177° C. (Control 1). Each part was then subjected to a second oven treatment, to simulate what would be encountered during powder topcoat curing (co-cure) of paint applied to other portions of the part. Each group of parts was subjected to a different co-cure temperature in the range of 177 to 232° C. The temperature used for each part and the performance of the parts is shown in Table 4.

TABLE 4

|  | Oven-1 (° C./minutes) | Oven-2 (° C./minutes) | MEK-200 DR | Cross Hatch Adhesion | 504 hrs NSS Total Avg. Scribe Creep (mm) | 1008 hrs NSS Total Avg. Scribe Creep (mm) |
|---|---|---|---|---|---|---|
| Control 1 | 177/30 | 200/18 | Pass | 5 B (100% Adhesion) | 1.27 | 3.01 |
| Control 2 | 163/30 | 200/18 | Pass | 5 B (100% Adhesion) | 1.80 | 2.81 |
| Ex 3-1 | 149/30 | 200/18 | Pass | 5 B (100% Adhesion) | 1.30 | 2.21 |

TABLE 4-continued

|  | Oven-1 (° C./ minutes) | Oven-2 (° C./ minutes) | MEK-200 DR | Cross Hatch Adhesion | 504 hrs NSS Total Avg. Scribe Creep (mm) | 1008 hrs NSS Total Avg. Scribe Creep (mm) |
|---|---|---|---|---|---|---|
| Ex 3-2 | 149/30 | 177/18 | Breakthrough @ 50 | 5 B (100% Adhesion) | 1.74 | 2.59 |
| Ex 3-3 | 149/30 | 232/18 | Pass | 5 B (100% Adhesion) | 1.91 | 3.35 |
| Ex 3-4 | 135/30 | 200/18 | Pass | 5 B (100% Adhesion) | 1.70 | 2.89 |

The results illustrate that de-watered panels can be handled prior to the curing oven with no impact on final corrosion or physical performance.

Example 4

A co-cure process for autodeposition coatings used in adhesive and sealant applications was tested. ACT CRS panels specimen (lab shear) specific for adhesive strength testing were contacted with an autodeposition bath comprising Aquence® 925G, commercially available from Henkel Corporation, for a sufficient time to deposit thereon an uncured autodeposition coating. The panels having the uncured autodeposition coating were subjected to a heat treatment such that a pair of panels was uncured (heated at 155° C.) and a pair of panels was chemically (i.e. cross-linked by heating) cured (heated at 177° C.). A subsequent layer of commercially available acrylic adhesive (2 component acrylic base) was applied and each pair of panels adhesively bonded, allowed to cure initially at room temperature and then co-cured at either 110° C. or 180° C. Two comparative examples were also prepared according to known methods by coating panels with a commercially available zinc phosphate coating. Comparative Example 4-3 was then coated with commercially available Electrodeposition Paint 1 and Comparative Example 4-4 was then coated with commercially available Electrodeposition Paint 2. Adhesive strength data is shown in Table 5.

TABLE 5

|  | Lap Shear Strength, Values at Room Temp. | |
|---|---|---|
|  | cure @ 10 min 110° C. | cure @ 10 min 180° C. |
| Ex. 4-1 Aquence ® 925G Dewatered: 30 min @177° C. | 17.5 MPa 18% sf 51% cf 31% af | 13.6 MPa 86% sf 10% cf 4% af |
| Ex. 4-2 Aquence ® 925G Dewatered: 30 min @155° C. | 15.1 MPa 63% sf 37% cf | 17.9 MPa 76% sf 34% cf |
| Comparative Ex. 4-3 | 12.2 MPa 99% sf 1% cf | 11.7 MPa 100% sf |

TABLE 5-continued

|  | Lap Shear Strength, Values at Room Temp. | |
|---|---|---|
|  | cure @ 10 min 110° C. | cure @ 10 min 180° C. |
| Comparative Ex. 4-4 | 7.9 MPa 100% sf | | cf = cohesive failure of adhesive
sf = paint delamination
af = adhesive failure

The foregoing test results showed improved adhesive strength using the co-cure/de-watering process as compared to conventional processes. This indicated that the co-cure process allows the two layers (autodeposition coating and adhesives to inter-cure thus strengthening the adhesive bond)

Example 5

Hot Rolled Steel (HRS) panels were used for the study. An epoxy acrylic autodeposition coating, Aquence® 930 coating bath, commercially available from Henkel Corporation was used to deposit an uncured autodeposition coating at 0.75-0.85 mils thickness (18-22 µm). Thereafter without prior curing of the autodeposition coating, a grey polyester TGIC (triglycidyl isocyanurate) powder paint was applied with a combined autodeposition layer-powder layer dry film thickness of 2.5-3.0 mil (62.5-75 µm).

A six stage coating process was used to prepare and coat the panels with the autodeposition coating: alkaline cleaner, tap water rinse, DI water rinse, Aquence® 930 autodeposition coating bath, tap water rinse and Aquence® E2 chemical rinse. The Aquence® E2 chemical rinse was heated to temperatures varying from 150-160° F. and contact time with the chemical rinse was either 2 or 4 minutes for each group of panels. After completing the six autodeposition stages, the uncured autodeposition coated panels were subjected to 10 minutes in a dehydration oven. Dewatering temperatures for the various groups of panels were either 158, 176, 194, or 212° F., see Table 6.

Thereafter, the polyester TGIC powder was applied to the dewatered autodeposition coating. The panels coated with uncured autodeposition coating and uncured powder paint were then subjected to 22 minutes ovening at temperatures of either 325 or 350° F. for each group of panels, see Table 6. The cured coated HRS panels were tested for physical and corrosion performance as shown in Table 6.

TABLE 6

| | Aquence ® 930 primer and Polyester TGIC powder | | | | | | | |
|---|---|---|---|---|---|---|---|---|
| Primer Cure 10 minutes | 70° C. (158° F.) | | 80° C. (176° F.) | | 90° C. (194° F.) | | 100° C. (212° F.) | |
| Topcoat Cure 22 minutes | 163° C. (325° F.) | 177° C. (350° F.) | 163° C. (325° F.) | 177° C. (350° F.) | 163° C. (325° F.) | 177° C. (350° F.) | 163° C. (325° F.) | 177° C. (350° F.) |
| Aquence ® E2 rinse time (min.) | 2    4 | 2    4 | 2    4 | 2    4 | 2    4 | 2    4 | 2    4 | 2    4 |
| 504 hrs Neutral Salt Spray, avg. total scribe creep (mm) | 0.4  0.3 | 1.2  1.2 | 0.5  0.5 | 1.1  1.5 | 0.4  0.5 | 1.1  1.1 | 0.6  0.9 | 0.9  1.0 |
| 1008 hrs Neutral Salt Spray, avg. total scribe creep (mm) | 1.5  1.6 | 0.7  1.0 | 0.7  0.9 | 0.8  0.9 | 1.1  1.2 | 2.3  1.0 | 2.2  0.8 | 1.0  1.1 |
| Crosshatch Adhesion (intercoat) ASTM D 3359-02 | 5B   5B | 5B   5B | 5B   5B | 5B   5B | 5B   5B | 5B   5B | 5B   5B | 5B   5B |

5B = 100% adhesion

The foregoing examples have been provided as illustrative of the invention and are not intended to limit the scope of the invention. While the invention has been described in terms of specific embodiments thereof, it will be appreciated that other forms could readily be adapted by one skilled in the art. Accordingly, the scope of the invention is to be considered limited only by the following claims.

What is claimed is:

1. A process for treating an article comprising a substrate having at least one active metal surface comprising steps of:
   a) contacting a substrate having at least one active metal surface with an autodeposition liquid composition comprising components:
      1) at least 1.0%, based on the autodeposition liquid composition, of a component of dissolved, dispersed, or both dissolved and dispersed film forming polymer molecules;
      2) optionally at least one emulsifier;
      3) at least one dissolved accelerator component selected from the group consisting of acids, oxidizing agents, and complexing agents that are not part of immediately previously recited components (1) or (2), this accelerator component being sufficient in strength and amount to impart to the total autodepositing liquid composition an oxidation-reduction potential that is at least 100 mV more oxidizing than a standard hydrogen electrode;
   the pH of the autodeposition liquid composition being between about 1 and about 4, for a sufficient time and at a sufficient temperature to deposit an uncured autodeposition coating on said at least one active metal surface;
   b) rinsing with water;
   d) dewatering the uncured autodeposition coating;
   e) depositing an uncured paint layer on the uncured autodeposition coating; and
   f) co-curing the uncured autodeposition coating and uncured paint layer.

2. The process of claim 1, wherein the film forming polymer molecules are selected from polymers and copolymers of acrylic, polyvinyl chloride, epoxy, polyurethane, phenol-formaldehyde condensation polymers, epoxy-acrylic hybrid polymer and mixtures thereof.

3. The process of claim 1 wherein the autodeposition liquid composition further comprises at least one cross-linker present in the uncured autodeposition coating; and wherein in step f) the uncured autodeposition coating and the uncured paint layer are co-cured to form on said at least one active metal surface a first layer of a cured autodeposition coating and a second layer of a cured paint, different from the first layer, such that the first and second layers are chemically cross-linked to each other.

4. The process of claim 3, wherein said cross-linker is blocked and has a de-blocking temperature, and the dewatering step d) is performed after step b) and before step f) wherein said coating is dewatered at a temperature of about 10 to 50 degrees less than the de-blocking temperature of said cross-linker.

5. The process of claim 4 wherein the coating is dewatered at a temperature of about 13 to 43 degrees less than the cross-linker de-blocking temperature.

6. The process of claim 3, wherein said cross-linker is a blocked isocyanate present in an amount of 0.01 to 15 wt % of the uncured autodeposition coating on a dried solids basis.

7. The process of claim 3, wherein the uncured paint layer is a powder paint layer.

8. The process of claim 1 wherein the uncured autodeposition coating is dewatered at a temperature of about 70-150° C.

9. The process of claim 1 wherein the uncured paint layer and the uncured autodeposition coating contain no amines and the co-cure temperature is at least 163° C.

10. The process of claim 1, wherein the uncured paint layer is a liquid paint layer or a powder paint layer.

11. The process of claim 10, wherein the uncured paint layer is a powder paint layer.

12. The process of claim 1 wherein the co-cure temperature is at least 180° C.

13. The process of claim 1 wherein the autodeposition liquid composition further comprises at least one cross-linker present in the uncured autodeposition coating.

14. The process of claim 13, wherein the film forming polymer molecules are acrylic, polyvinyl chloride, epoxy or epoxy-acrylic hybrid polymers and the at least one cross-linker is a blocked isocyanate present in an amount of 0.01 to 15 wt % of the uncured autodeposition coating on a dried solids basis.

15. The process of claim 14, wherein said blocked isocyanate has a de-blocking temperature, and the coating is dewatered at a temperature of about 10 to 50 degrees less than the de-blocking temperature of said blocked isocyanate.

16. The process of claim 13 wherein the uncured autodeposition coating is dewatered at a temperature of about 70-150° C. and the co-cure temperature is at least 163° C.

17. The process of claim 13, further comprising prior to step d), a step c) of contacting the uncured autodeposition coating with an alkaline or acidic rinse.

18. The process according to claim 1 wherein in step f) the uncured autodeposition coating and the uncured paint layer are co-cured to form on the metal surface a cured coating comprising: a first layer comprising a cured autodeposition coating deposited on the metal surface; and a second layer of cured paint, different from the first layer, wherein said first and second layers are cross-linked to each other via COOH-epoxy reactions and/or OH—NCO urethane reactions.

19. The process of claim 1 wherein the uncured autodeposition coating is dewatered at a temperature of about 90-165° C.

20. The process of claim 1 wherein the uncured autodeposition coating is dewatered at a temperature of about 120-150° C.

21. The process of claim 1 wherein the uncured autodeposition coating is dewatered at a temperature of about 121-163° C.

22. The process of claim 1 wherein the uncured autodeposition coating is dewatered at a temperature of about 135-163° C.

23. The process of claim 1 wherein the uncured autodeposition coating is dewatered at a temperature of about 138-182° C.

24. The process of claim 1 wherein the uncured autodeposition coating is dewatered at a temperature of at least 100° C. for a duration of heating selected such that the uncured autodeposition coating remains substantially uncross-linked.

* * * * *